United States Patent Office 3,497,505
Patented Feb. 24, 1970

3,497,505
CEPHALOSPORIN ANTIBIOTIC AND
PROCESS THEREFOR
Ralph R. Pfeiffer and Edmond M. Bottorff, Indianapolis, and Larry L. Moore, Bargersville, Ind., assignors to Eli Lilly and Company, Indianapolis, Ind., a corporation of Indiana
No Drawing. Filed Oct. 24, 1966, Ser. No. 588,750
Int. Cl. C07d 99/24
U.S. Cl. 260—243                                     5 Claims

ABSTRACT OF THE DISCLOSURE

Cephaloglycin antibiotic in substantially anhydrous crystalline form and a process which comprises dissolving hydrated cephaloglycin in formamide or N-methylformamide and mixing the resulting solution with an alkanol, acetonitrile, or an alykyl alkanoate to precipitate crystalline cephaloglycin, and drying the crystals to less than 1 percent water.

This invention relates to cephalosporin antibiotics. More particularly, this invention provides a new crystalline form of cephaloglycin, 7-(D-α-aminophenylacetamido)cephalosporanic acid, and a new process for purifying and preparing substantially anhydrous cephaloglycin.

Cephaloglycin is a generic term used to identify a chemical compound:

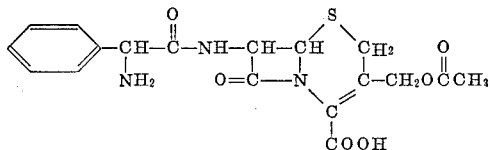

The D-form of this chemical has been found active as a broad spectrum antibiotic which is effective in controlling diseases caused by a wide variety of Gram-positive and Gram-negative microbiological organisms. One of the unique features of this cephalosporin is that it has shown outstanding advantages for use as an oral antibiotic.

Cephaloglycin is one of the semi-synthetically produced cephalosporins. It is usually made, for example, by acylating the so-called cephalosporin nucleus, 7-aminocephalosporanic acid:

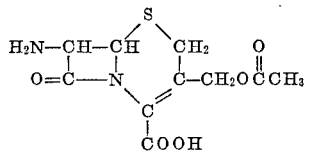

commonly known as 7-ACA, in an aqueous medium with a mixed anhydride form of phenylglycine in which the free amino group has been protected against reaction by use of a suitable blocking group, to form the 7-(α-[blocked amino]phenylacetamido)cephalosporanic acid, and then removing the blocking group by conventional methods to form the desired 7-(α-aminophenylacetamido)cephalosporanic acid.

The cephaloglycin recovered from such a reaction mixture has been an off-white crystalline powder containing a sizeable fraction of impurities, notably 7-aminocephalosporanic acid and phenylglycine and various coloring agents. This cephaloglycin power contains from one to two moles (about 4 to 10% by weight) of chemically bound water as water of crystallization. In addition, these cephaloglycin crystals, upon standing, lose microbiological potency at an undesirably fast rate. Attempts to remove water below about four percent by drying the crystals are impractical due to the extreme tenacity with which the water is held and the inherent instability of the cephaloglycin at elevated temperatures. Prior to this invention, purification of these hydrated cephaloglycin crystals on a large scale was prohibited because these crystals were only sparingly soluble (less than 1%) in a wide variety of common solvents such as water, alkanols, dimethylsulfoxide, and dimethylformamide. Also, attempts to make soluble salts and other derivatives failed to yield satisfactory cephaloglycin forms.

It is an object of this invention to provide a new crystalline form of cephaloglycin.

It is another object of this invention to provide a relatively simple process for converting crude hydrated cephaloglycin crystals obtained from an aqueous acylation reaction medium to a more stable and more pure crystal form.

Other objects, aspects, and advantages of this invention will become apparent to those skilled in the art, from reading the description of the invention and the claims which follow.

Briefly, according to this invention it has been found that the hydrated cephaloglycin obtained as a precipitate from the aqueous acylation reaction mixture has a surprisingly high (about 20 percent by weight) solubility in N-methylformamide and in formamide, and that by dissolving the hydrated cephaloglycin in one of these two solvents, or a mixture of them, under substantially anhydrous conditions and then by commingling the resulting cephaloglycin solution with a substance which is not a solvent for cephaloglycin, such as a lower alkanol having from 1 to 4 carbon atoms, or acetonitrile, or an alkyl alkanoate having up to about 7 carbon atoms, in an amount to cause formation of new cephaloglycin crystals, there is obtained a substantially white crystal form of cephaloglycin which can be separated and dried by conventional methods to contain less than 1% by weight, preferably less than 0.5% by weight, of water therein, which crystal form is different from that of the original hydrated cephaloglycin crystal form, and which is essentially non-hygroscopic and stable against chemical decomposition and loss of microbiological potency for a substantially longer period than is the original hydrated cephaloglycin. In addition, hydrated cephaloglycin prepared from the new cephaloglycin crystal form is much more stable than the original hydrated cephaloglycin.

A particularly preferred manner of conducting the process of this invention is to slurry the hydrated cephaloglycin crystals in a mixture of either N-methylformamide, formamide, or a mixture of the two solvents, protected from substantial atmospheric moisture by use of a sealed container or a nitrogen blanket, etc., with an amount of one of the non-solvents or anti-solvents to keep the mixture as a solid-liquid slurry, and to stir the mixture for a time sufficient to effect dissolution of the hydrated cephaloglycin crystals and precipitation of the substantially anhydrous cephaloglycin crystals, and then to separate the cephaloglycin from the liquid mixture, wash the crystals with an appropriate non-solvent if desired, and dry the crystals to a water content below about 1% by weight, preferably under about 0.5% by weight. The new crystal form of cephaloglycin thus obtained is both cleaner and more stable than is the hydrated cephaloglycin obtained from the acylation reaction mixture. The white crystals obtained are low in water content and have unique X-ray diffraction properties.

The new cephaloglycin crystals of the present invention can be produced in good yield on a large scale and can be made to contain less than one-half percent water. The process of this invention represents and provides great improvement in the product in terms of its appearance, odor, taste, chemical purity, microbiological potency, clarity of its solutions, and most important to its potential usefulness, in chemical stability in the solid state.

The substantially anhydrous crystals of cephaloglycin of this invention can be formulated as such into appropriate pharmaceutical dosage forms. However, it has been found that for some applications it may be preferred to re-hydrate the new substantially anhydrous crystal cephaloglycin to the extent of about 4 to 12 percent by weight by stirring or grinding the anhydrous cephaloglycin crystals in water or solvent-water mixtures or by recrystallizing hydrated cephaloglycin from N-methylformamide-water or formamide-water mixtures. In such hydrated form the purified cephaloglycin is sufficiently stable and is easier to handle in making, e.g., liquid or reconstitutable pharmaceutical formulations than is the substantially anhydrous form.

The process of this invention and the new substantially anhydrous crystal form of cephaloglycin are believed to be quite surprising and unique for the following reasons. Hydrated cephaloglycin as prepared and recovered from the acylation reaction mixture is unstable. Attempts to dehydrate this hydrated cephaloglycin by vacuum drying at various temperatures decomposed it. The use of drying agents such as acetic anhydride in acetic acid or phosphorus pentoxide in acetic acid were also unsuccessful. Other solvent/non-solvent combinations all resulted in cephaloglycin crystal forms which were hydrated; e.g., acetic acid/acetic acid saturated with sodium acetate (70° C.); acetic acid/acetonitrile (room temperature); acetic acid, then concentrated/acetonitrile; acetic acid at room temperature/acetone; acetonitrile and triethylamine/ acetonitrile and acetic acid; acetonitrile and triethylamine/ acetic acid; formic acid, then concentrated/acetonitrile; dimethylacetamide and triethylamine/methanol, hydrogen chloride, acetonitrile; dimethylacetamide and triethylamine/formic acid and methyl isobutyl ketone; dimethylformamide and triethylamine/methanol, hydrogen chloride, and acetonitrile; and dimethylformamide and triethylamine/formic acid and methyl isobutyl ketone. The potassium salt of cephaloglycin was formed using potassium 2-ethylhexanoate. Attempts to dehydrate this salt were unsuccessful. Recrystallizing the salt was not helpful. Cephaloglycin obtained from this salt was also hydrated. Attempts to remove water from the cephaloglycin hydrate by warming it in a water bath at 40, 50, 60, 70, 80, 89, and 96° C. were unsuccessful. An attempt to form the tosylate of cephaloglycin was unsuccessful. Several attempts to make the hydrochloride of cephaloglycin were discouraging.

As indicated above, finding the successful approach to obtaining a substantially pure, stable anhydrous cephaloglycin has not been easy. Success in the process does not involve merely the dissolution of the hydrated cephaloglycin in the N-methylformamide or formamide, because in such solution cephaloglycin does not easily precipitate therefrom even when the solution is cooled to 0° C. in a freezing compartment. Nor can N-methylformamide or formamide be easily stripped away from the dissolved cephaloglycin. In addition, when hydrated cephaloglycin is slurried in minimum amounts of N-methylformamide or formamide or mixtures of the two solvents to effect dissolution of some of the cephaloglycin, the slurry-solutions become quite viscous and difficult to stir or otherwise agitate when attempting to obtain good liquid-solid contact.

It has been found according to this invention that the desired cephaloglycin crystal form which becomes substantially anhydrous upon drying can be obtained if a suitable non-solvent or anti-solvent for cephaloglycin is present in the mixture or added to the cephaloglycin solution. These non-solvents serve two functions—to help reduce or maintain the viscosity of the N-methylformamide or formamide solution of cephaloglycin at a stirrable consistency and to assist in effecting precipitation of the new crystalline form of cephaloglycin. The non-solvents or anti-solvents of choice for this purpose are lower alkanols having from 1 to 4 carbon atoms including methanol, ethanol, isopropanol, n-propanol, n-butanol, sec-butanol, and tert-butanol, acetonitrile, and other closely homologous nitriles such as propionitrile, butanonitrile, and alkyl alkanoates having up to about 7 carbon atoms such as methyl formate, methyl acetate, ethyl acetate, proply acetate, amyl acetate, ethyl propionate, butyl acetate, etc. The use of methanol, isopropanol, ethyl acetate, and acetonitrile or combinations of these non-solvents give good results. Better results are obtained when the N-methylformamide and formamide solvents and the selected non-solvents are kept as dry (free from water) as possible. When acetonitrile is used as a non-solvent, best results are obtained when the N-methylformamide or formamide solution of cephaloglycin is first diluted with an alkanol such as methanol before acetonitrile is added.

The mixture of cephaloglycin, solvent, and non-solvent is preferably stirred for a time sufficient to lower the water content of cephaloglycin crystals obtained therefrom to about 1 percent by weight or lower upon drying. Usually the mixture will be stirred for at least about 0.5 hour to ensure water content reduction in the crystalline product, but time studies with formamide-methanol have indicated that the dehydrating effect is essentially completed in about one hour. However, when other non-solvents such as acetonitrile are used, it may be necessary to stir the mixture for 4 to 10 hours to obtain cephaloglycin crystals which can be dehydrated to the desired low water content.

The ratio of N-methylformamide or formamide to hydrated cephaloglycin should be at least about 1 ml. of the solvent for each gram of the hydrated cephaloglycin. Preferably, the ratio should be at least about 1.25 ml. of the solvent for each gram of the cephaloglycin starting material. When the solvent ratio is much below these levels, the water content of the crystalline cephaloglycin obtained therefrom is somewhat higher.

As indicated above, the non-solvent should be used in an amount to reduce or maintain the viscosity of the cephaloglycin slurry mixture to a stirrable consistency. It is preferred to use at least about 4 ml. of methanol per gram of original hydrated cephaloglycin, since lower amounts of methanol permit cephaloglycin sluries in N-methylformamide or formamide to become too thick for adequate stirring and do not increase the yield of the desired new crystalline form of cephaloglycin.

Hydrated cephaloglycin still damp from acetone washing may be used in the process of this invention but it is preferred to dry this starting material somewhat to remove acetone and some water to improve the yield of the crystalline cephaloglycin product thereafter obtained.

The invention is further illustrated by the following examples.

EXAMPLE 1

*dl*-Phenylglycine is resolved in a conventional manner by reaction with cinchonine, fractional crystallization of the resulting diastereoisomers, and acidification to release the phenylglycine enantiomorphs.

*d*-Phenylglycine, thus prepared, is reacted with methyl acetoacetate in the presence of sodium hydroxide to form the protected-amino phenylglycine sodium salt.

A 12.5 g. portion of this protected-amino phenylglycine sodium salt is suspended in 140 ml. of acetonitrile and then 0.1 ml. of benzyldimethylamine is added. The resulting suspension is cooled to −10° C. with stirring and then 6 g. of ethyl chloroformate is added in one portion and the mixture is stirred for twenty minutes in an ice bath to form the mixed anhydride of the protected amino phenylglycine.

A previously prepared solution of 12.6 g. of 7-aminocephalosporanic acid in a mixture of 60 ml. of water, 60 ml. of acetonitrile, and 6.8 ml. of triethylamine, cooled to 0 to 5° C., is added in one portion to the mixed anhydride solution described above. The resulting mixture is stirred in the cold for an hour. Triethylamine is added to clarify the solution and then solid sodium chloride is added to effect separation of layers. After about fifteen minutes the layers are separated. The volume of the aqueous lower layer is measured, which is usually about 55–60 ml., and this volume of water is added to the organic upper layer. The aqueous lower layer is discarded. The organic layer is evaporated under reduced pressure at a temperature not exceeding 25° C. to a volume of 75 to 85 ml. This 75–85 ml. concentrated organic liquid residue is commingled with stirring with 16 ml. of formic acid and 150 ml. of methyl isobutyl ketone to remove the methyl acetoacetate from the amino group, during which operation hydrated cephaloglycin crystals being to crystallize. The mixture is cooled in a refrigerator overnight. Crystalline hydrated cephaloglycin is recovered from the mixture by filtration, washed with water, then with acetonitrile, and dried overnight at 40° C. under vacuum. Hydrated cephaloglycin [7 - d-α-(aminophenylacetamido) cephalosporanic acid] containing 4 to 5 percent water by weight is obtained as an off-white solid in a yield of 5 to 6 grams.

The above-named compound has a high degree of activity against many Gram-negative pathogens as shown by the following lists of its minimum inhibitory concentration against a series of said pathogens.

| Organism: | Activity, MIC, μg./ml. |
|---|---|
| Aerobacter aerogenes | 2.1–6 |
| Salmonella enteritidis | 6 |
| Klebsiella pneumoniae | 2.9–6 |
| Escherichia coli | 2.3–6 |
| Shigella sp. | 2.5–6.8 |

EXAMPLE 2

In a 250 ml. 3-necked, round-bottom flask there were placed 10 g. of hydrated 7 - (D-α-amino-α-phenylacetamido)cephalosporanic acid (cephaloglycin) prepared as described in Example 1, together with 40 ml. of methanol and 12.5 ml. of formamide. The flask was sealed and the slurry mixture was stirred for an hour at room temperature. The mixture was filtered on a medium sintered filter, washer and slurried well with methanol, and then dried. There were obtained 7.7 g. (77% yield) of white crystalized material. Assays of the initial hydrated cephaloglycin and of cephaloglycin resulting from the above treatment were made and the results are given in the following table:

TABLE 1

| Test | Before treatment | After treatment |
|---|---|---|
| Karl Fisher water, percent | 4.74 | 0.42 |
| U.V. (E value) $e_{1cm, 1\%}$ 260 mμ | 199 | 219 |
| U.V. (E molar) | 7,885 | 9,088 |

In addition, samples of the hydrated and the treated cephaloglycin were assayed for amino-acid content. The results are given in the following table:

TABLE 2

| Amino acid | Before treatment | After treatment |
|---|---|---|
| 7-ACA | .068 | 0.50 |
| Phenylglycine | .031 | None |
| Cephaloglycin | 3.04 | 3.84 |

The purified essentially anhydrous cephaloglycin crystals exhibited essentially the following X-ray powder diffraction data at λ=1.5405 using a North American Philips Co., Inc., X-ray diffraction apparatus, type 5019:

| Interplanar spacing, d: | Relative intensities, $I/I_1$ |
|---|---|
| 9.40 | 1.00 |
| 8.58 | .50 |
| 7.13 | .30 |
| 6.70 | .50 |
| 5.71 | .40 |
| 5.18 | .15 |
| 4.69 | 1.00 |
| 4.37 | .70 |
| 4.28 | .90 |
| 3.98 | .60 |
| 3.75 | .04 |
| 3.58 | .70 |
| 3.36 | .40 |
| 3.14 | .20 |
| 3.03 | .30 |
| 2.87 | .08 |
| 2.73 | .20 |
| 2.60 | .40 |
| 2.52 | .15 |
| 2.39 | .10 |
| 2.28 | .10 |
| 2.23 | .10 |
| 2.12 | .02 |
| 2.02 | .02 |
| 1.93 | .02 |
| 1.88 | .02 |
| 1.68 | .02 |

EXAMPLE 3

This example illustrates the usefulness and stability of crystalline cephaloglycin, stored in a dry pediatric pharmaceutical composition.

The substantially anhydrous cephaloglycin, prepared as described in Example 2, is rehydrated to a water content of about 10 percent by weight by grinding the anhydrous cephaloglycin crystals for about 0.5 hour in water, filtering the mixture, washing the solid with acetone, and then drying in a vacuum oven to constant weight. The rehydrated cephaloglycin was formulated into the following composition:

Formula for suspension cephaloglycin to provide 250 mg./5 cubic centimeters

| | Weight, g. |
|---|---|
| Crystalline cephaloglycin hydrate | 5.5 |
| Sucrose, Baker's grade | 50.0 |
| Saccharin, soluble | 0.2 |
| Sodium cyclamate | 1.0 |
| Sodium chloride, U.S.P. powder | 0.5 |
| Citric acid powder | 0.1 |
| Sodium citrate powder | 0.2 |
| F, D, and C Yellow No. 6, aluminum lake certified | 0.05 |
| Imitation orange juice flavor, 59.107/AP Firmenich, Inc. | 1.0 |
| Peppermint flavor E 1395 | 0.1 |
| | 58.65 |

Samples of the above formulation were stored as a dry powder mixture in sealed containers at 25, 37, and 50° C. for time periods up to 1 month. When samples were taken for standard microbiological assay of cephaloglycin content of the dry mixture, a proper amount of purified water was added to make the suspension containing about 50 mg. of cephaloglycin per cubic centimeter of suspension. Microbiological assays showed cephaloglycin contents in mg./cc. of cephaloglycin as set forth in Table 3.

TABLE 3

| | Storage temperature | | |
|---|---|---|---|
| | 25° C. | 37° C. | 50° C. |
| Theory (50 mg./cc.) | | | |
| Initial (upon formulation) 52 mg./cc. | | | |
| 2 weeks | 50 | 49 | 48 |
| 1 month | 49 | 50 | 51 |

These data show that the dry formulation was essentially completely stable to the various storage temperatures for up to 1 month.

EXAMPLE 4

This example illustrates the wet storage stability of the re-hydrated cephaloglycin formulated into the dry mix composition shown in Example 3 and then suspended with water and stored in such suspension form for up to 7 days. The cephaloglycin content was determined by microbiological assay of the aqueous suspension as in the preceding example. The aqueous suspension was made originally to provide 50 mg./cc. of cephaloglycin. Samples of the aqueous cephaloglycin formulation suspensions were stored at 5, 25, 37, and 50° C. Table 4 summarizes the results obtained in mg./cc. of cephaloglycin.

TABLE 4

| | Storage temperature (° C.) | | | |
|---|---|---|---|---|
| | 5 | 25 | 37 | 50 |
| Theory (50 mg./cc.) | | | | |
| Initial (50 mg./cc.) | | | | |
| 1 day | | 45 | 52 | 36 |
| 2 days | | 48 | 47 | 42 |
| 3 days | | 44 | 45 | 42 |
| 7 days | | 44 | 44 | 35 |

These data show that even in aqueous suspension for periods up to a week, the aqueous suspension still contained a major amount of the original cephaloglycin content.

The microbiological assay for cephaloglycin is the same as the microbiological assay for penicillin described in analytical Microbiology, edited by F. W. Kavanagh, Academic Press, New York, 1963, pp. 327–339, with the following exceptions:

(1) Standard Solutions (p. 328). Dissolve the cephaloglycin standard in sufficient distilled water to give a stock solution containing 500 micrograms of cephaloglycin per milliliter. The stock standard solution should be freshly prepared on the day of assay.

(2) Sample Preparation (p. 329). Dissolve the cephaloglycin sample in sufficient distilled water to give a solution containing 500 micrograms of cephaloglycin per milliliter. Further dilute the solution with 0.1 M potassium phosphate buffer, pH 4.5, to give a reference concentration of 10 micrograms of cephaloglycin per millimeter.

(3) Standard Curve (p. 331). Prepare the standard curve by further diluting the 500 micrograms per milliliter stock solution in 0.1 M potassium phosphate buffer, pH 4.5, to obtain concentrations forming a geometric progression in the range 2.0 to 20.0 mcg. per ml. Use the 10 mcg. per ml. dose level as the reference level for application to all standard curve plates and for each assay plate.

We claim:

1. A method for preparing a substantially anhydrous crystalline form of cephaloglycin which method comprises dissolving hydrated cephaloglycin in N-methylformamide or formamide or a mixture thereof under substantially anhydrous conditions, commingling the resulting solution with a substantially water-free anti-solvent for cephaloglycin of the group consisting of alkanols having from 1 to 4 carbon atoms, acetonitrile, and alkyl alkanoates having a maximum of about 7 carbon atoms per molecule to effect a precipitation of cephaloglycin crystals, and drying the resulting crystals to obtain cephaloglycin crystals which contain less than 1 percent by weight of water.

2. A method as described in claim 1 wherein the hydrated cephaloglycin is slurried in a mixture of formamide and an alkanol having from 1 to 4 carbon atoms, the formamide being present in an amount sufficient to dissolve some of the hydrated cephaloglycin in the presence of cephaloglycin crystals, the alkanol being present in an amount to maintain the viscosity of the mixture as a stirrable solid-containing liquid medium.

3. A method as described in claim 2 wherein the lower alkanol used is methanol and the formamide, methanol, cephaloglycin mixture is stirred for at least about one-half hour to reduce the water content of the cephaloglycin crystals taken therefrom and dried to about 0.5 percent or less by weight.

4. A method as described in claim 1 wherein hydrated cephaloglycin is dissolved in N-methylformamide, the resulting solution is contacted with enough methanol to reduce the viscosity of the mixture, and then isopropanol is added with stirring to a concentration sufficient to premit growth of cephaloglycin crystals, the cephaloglycin crystals are filtered from the mixture, washed with methanol, and dried to obtain cephaloglycin crystals containing less than 0.5 percent by weight of chemically bound water.

5. A crystalline form of 7-(D-α-aminophenylacetamido)-cephalosporanic acid characterized by being substantially nonhygroscopic, containing less than 1 percent by weight of water, and exhibiting essentially the following X-ray diffraction data:

| Interplanar spacing, d: | Relative intensities, $I/I_1$ |
|---|---|
| 9.40 | 1.00 |
| 8.58 | .50 |
| 7.13 | .30 |
| 6.70 | .50 |
| 5.71 | .40 |
| 5.18 | .15 |
| 4.69 | 1.00 |
| 4.37 | .70 |
| 4.28 | .90 |
| 3.98 | .60 |
| 3.75 | .04 |
| 3.58 | .70 |
| 3.36 | .40 |
| 3.14 | .20 |
| 3.03 | .30 |
| 2.87 | .08 |
| 2.73 | .20 |
| 2.60 | .40 |
| 2.52 | .15 |
| 2.39 | .10 |
| 2.28 | .10 |
| 2.23 | .10 |
| 2.12 | .02 |
| 2.02 | .02 |
| 1.93 | .02 |
| 1.88 | .02 |
| 1.68 | .02 |

References Cited

UNITED STATES PATENTS 3,352,858  11/1967  Crast et al.

NICHOLAS S. RIZZO, Primary Examiner

U.S. Cl. X.R.

424—246